United States Patent [19]

Sharp

[11] Patent Number: 4,995,528
[45] Date of Patent: Feb. 26, 1991

[54] RIBBED STORAGE TANK SYSTEMS WITH INTERIOR WALL SECTIONS FOR ENHANCED STRENGTH

[76] Inventor: Bruce R. Sharp, 22375 Edgewater Dr., Unit 241, Charlotte Harbor, Fla. 33980

[21] Appl. No.: 467,208
[22] Filed: Jan. 19, 1990
[51] Int. Cl.⁵ ............................................. B65D 90/04
[52] U.S. Cl. ................................. 220/445; 220/469; 220/651; 220/669; 220/672
[58] Field of Search ............... 220/469, 444, 464, 5 A, 220/71, 83, 5 R, 466, 431, 3, 1 B, 651, 654, 669, 675, 677, 678, 565

[56] References Cited

U.S. PATENT DOCUMENTS

| | | | |
|---|---|---|---|
| 1,687,343 | 10/1928 | Madden | 220/75 |
| 3,203,845 | 8/1965 | Short | 156/175 |
| 3,335,903 | 8/1967 | Anderson | 220/83 |
| 3,335,904 | 8/1967 | Anderson | 220/83 |
| 3,412,891 | 11/1968 | Bastone et al. | 220/83 |
| 3,700,512 | 10/1972 | Pearson et al. | 156/62.4 |
| 3,851,786 | 12/1974 | Kaemper | 220/3 |
| 4,640,439 | 2/1987 | Palazzo | 220/445 |
| 4,655,367 | 4/1987 | Palazzo | 220/445 |
| 4,676,093 | 6/1987 | Pugnale et al. | 73/49.2 |
| 4,715,513 | 12/1987 | Shelton, Jr. | 220/469 |
| 4,780,946 | 11/1988 | Palazzo | 29/455.1 |
| 4,780,947 | 11/1988 | Palazzo | 29/455.1 |
| 4,817,817 | 4/1989 | Palazzo | 220/445 |

OTHER PUBLICATIONS

"Xerxes Corporation Tanks Meet Regulations", *Petroleum Marketeer*, Nov.–Dec., 1985, pp. 35–36.

*Primary Examiner*—Stephen Marcus
*Assistant Examiner*—Stephen K. Cronin
*Attorney, Agent, or Firm*—Charles R. Wilson

[57] ABSTRACT

A method of making a storage tank system comprises forming a series of circumferentially extending wall sections on the interior walls of a cylindrical-shaped ribbed storage tank. The storage tank has a contour surface with rib recesses. Each wall section is bonded to the tank's interior walls at a distance of less than about one inch in height from the tank wall and extends laterally across a rib recess.

8 Claims, 2 Drawing Sheets

RIBBED STORAGE TANK SYSTEMS WITH INTERIOR WALL SECTIONS FOR ENHANCED STRENGTH

This invention relates to storage tank systems. More particularly, the invention relates to underground storage tank systems wherein the outer wall is of a ribbed fibrous reinforced resinous construction.

BACKGROUND OF THE INVENTION

Underground storage tanks used primarily for the storage of gasoline are currently made of metal or a fibrous reinforced resinous material. The all metal tanks are cylindrical shaped, normally with flat end caps. The fibrous reinforced resinous tanks also are cylindrical shaped, with one tank variation having a ribbed appearance with domed ends. The ribbed variation has a series of evenly spaced ribs extending circumferentially around the main body of the tank. The ribs significantly strengthen the tank. Additionally, they are able to absorb a certain degree of transport and installation external forces, which normally would have to be absorbed by the main body of the tank.

There are two methods which are widely used for building the ribbed fibrous reinforced resinous tanks. In one method, the main body of the tank is formed over a collapsible cylindrical shaped mold. Thus, a half mold having a smooth surface of proper shape has fibrous material and resinous material applied to its outer surface and cured. The basic wall forming components are applied separately or concurrently from separate spray guns. After proper curing, the mold is collapsed and removed. A second half tank is formed in a similar manner. The two half tanks are joined and secured together. A set of ribs are placed in desired locations on the exterior of the tank and adhered thereto by applications of fibrous and resinous materials.

A second method of building a ribbed fibrous reinforced resinous tank also uses a mold. However, in this method, the mold itself is shaped so that ribs are formed along with the rest of the main body. That is, the molds are provided with the mirror image of ribs. Fibrous material and resinous material are applied as in the first described method and ultimately cured.

Attempts have been made in recent years to build double walled steel and fibrous reinforced resinous tanks. Obvious methods have involved simply forming two tanks, one slightly smaller in diameter and length. The two properly dimensioned tanks are combined, normally with spacers, and used. Ribbed tanks having a double wall construction are not conducive to being formed in this manner.

There is a need for a strengthened ribbed storage tank system. Such systems would have the strength characteristics resulting from the rib feature. The problem has been how to build such a tank system in an efficient manner. There has now been discovered a method of building ribbed storage tank systems using a unique sequence of construction steps. The method is efficient in terms of labor savings and raw material savings.

SUMMARY OF THE INVENTION

A ribbed storage tank made of fibrous reinforced resinous material is strengthened by forming spaced independent wall sections within its interior. The storage tank is cylindrical-shaped with integral ribs. The interior surface of the tank has a series of recesses which represent the insides of the ribs. Each wall section is positioned and attached at its edges to the interior wall of the tank so as to extend across a rib recess. The wall sections strengthen the tank and add a secondary containment feature to a substantial part of the tank.

DETAIL DESCRIPTION OF THE INVENTION

The invention is described with reference to the drawings and with reference to underground storage tanks for use in retail gasoline service stations in particular. The storage tank system of the invention has use in the above ground storage of other liquids as well. It is to be understood such uses are contemplated.

Figure 1:
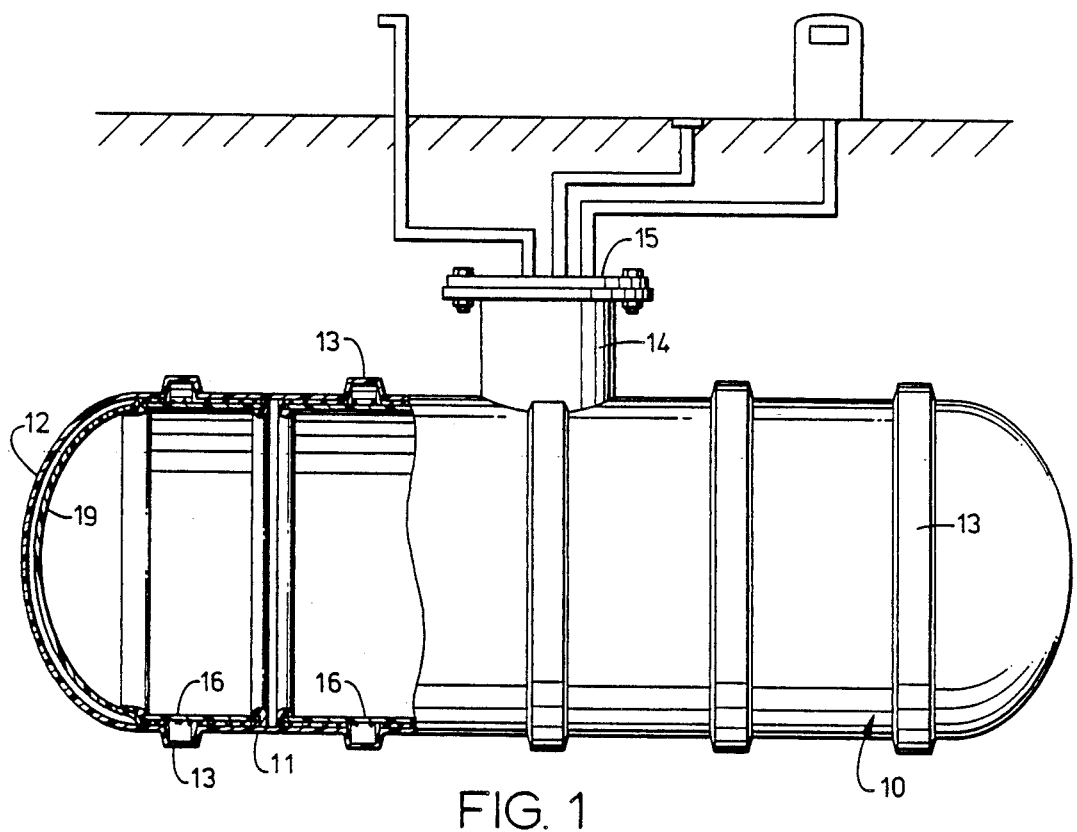
FIG. 1 is a side view partially in section of a ribbed storage tank system of this invention.

With reference to FIG. 1, there is shown a ribbed storage tank system. The outer tank 10 of the type shown in FIG. 1 is commercially produced, especially for use in the gasoline service station industry. Such tanks comprise a main cylindrical-shaped body 11 and dome-shaped end walls 12. Main body 11 and end walls 12 are made of fibrous reinforced resinous material. The ribs 13 are an integral part of the main body 11. A manway 14 is attached to the top surface of the storage tank. The manway is cylindrical-shaped and is generally about eighteen inches to about thirty inches in diameter. Its purpose is to provide a means by which access is gained to the interior of the tank for inspection and repair reasons. Not illustrated but within the spirit of this invention are those tanks wherein the end walls are flat and those tanks not having manways.

Storage tank 10 forming a part of this invention is formed in a conventional fashion. A cylindrical-shaped mold in the form of a lateral half of the storage tank is provided with contoured sides in the form of ribs. The ribs extend circumferentially around the mold. A half tank is initially made by applying a fibrous material and a resinous material to the mold. Fibrous materials made of fiberglass, nylon, and other synthetic materials are in the form of mattings, nets, screens, meshes, continuous strands and chopped strands. The form of the fibrous material is dictated by the mode of production. Resinous materials include the polyesters, e.g. vinylester and isophthalic polyesters, polyurethanes and polyepoxides. Other fibrous and resinous materials are used, it being understood the aforementioned materials are only exemplary of the materials which can be used.

The manner of forming the cylindrical shaped main body with the fibrous and resinous materials is based on one of at least three known techniques. A preferred technique utilizes a two-head spray gun to spray separate streams of chopped fibrous material and liquid resinous material onto the mold. The spray applications are controlled to form a desired thickness of materials which are dried of solvent and cured. If needed, a series of spray applications is used to build the wall's thickness until eventually a wall of proper strength is obtained. Alternatively, sheets of fibrous material and resinous material are applied to the mold. Sufficient resin is sprayed to normally saturate the fibrous sheet or at least penetrate the sheet's surface to form a continuance solid outer surface. The resin is subsequently cured. Still another known technique used to build storage tanks of the type used in their invention is to apply filament windings of fibrous strands around the tank mold. The strands are saturated with liquid resin at the time of winding or the liquid resin is applied shortly thereafter and cured. In the known technique, an end cap is formed at the same time as the main walls and in the same manner or alternatively is formed separately and attached to the main cylindrical-shaped wall.

In all the above described manners of building the outer tank 10, the mold on which the fibrous reinforced resinous material tank is formed is collapsed or opened and removed. Next, another lateral tank half formed in the same manner is abutted against the first lateral tank half and securely joined. The resultant full tank is a single walled structure. Ribs formed as a part of its making add structural strength to the tank to withstand external forces encountered during use. The ribs are characterized in being hollow and open to the tank's interior.

In accord with this invention, a series of independent spaced wall sections 16 are formed inside the storage tank 10. The wall sections are bonded or anchored directly to an interior wall of the storage tank. Each section extends circumferentially around the interior wall of the storage tank and extends laterally across a rib recess 17. Each of the sections is attached along both its edges to the tank. The mid portions of each section 1 between the edges cover a rib recess. The sections extend less than about one inch in height from the tank wall, preferably from about 1/64 inch to about ¼ inch. Portions of the wall sections may contact the tank wall 11 and, in fact, is preferred. Such contact is not detrimental to the storage tank system's performance provided the tank wall and wall sections remain at least partially separated, i.e. they are not sealed together.

The width of a wall section ranges from about eight inches to about sixty inches. For purposes of illustration only, the ribs 13 and consequently wall sections in FIG. 1 appear larger than are normally encountered. The preferred width of a section is from about twelve inches to about twenty inches. About two inches to about six inches, preferably about three inches to about five inches separate the individual wall sections. The preferred wall section widths and spacing varies, based on structural design and size of the tank. The aforementioned preferred widths are for a storage tank having a diameter of from about four feet to about twelve feet.

Figure 2:
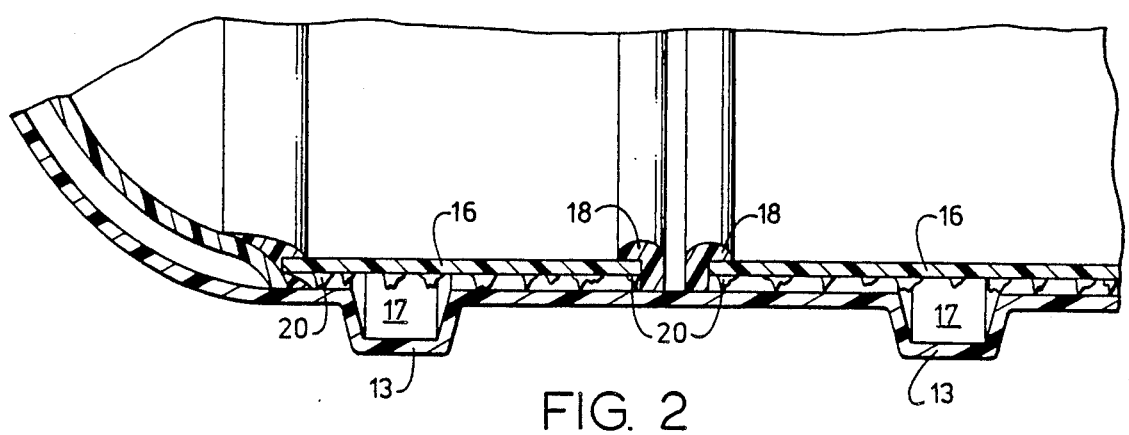
FIG. 2 is an enlarged side view in section showing in detail a wall area of the storage tank system of FIG. 1.

The bonding technique used to secure wall sections 16 to the side walls of storage tank 10 will depend on the materials of construction of the wall sections, per se. Adhesive and caulking can be used. Preferably, as best seen in FIG. 2 the wall sections are made of fibrous reinforced resinous material and the bonding is accomplished using an overlay 18 of the same material. The overlays 18 can, though need not must, cover the inner tank surface areas between the wall sections. Attachment of the wall sections to the tank in this preferred manner enhances the overall strength of the tank and hence the composite strength of the storage tank is increased.

Inner end caps 19, which are optional, may be preformed. They are preferably made of fiberglass reinforced resinous material and positioned over the tank's end walls. A space between the end caps and end walls is provided to receive leaked liquid. As shown in FIG. 1, the inner end cap 19 is attached to the side wall of the storage tank 10. A wall section 16 is bonded to the inner end cap.

One method of forming the wall sections 16 depicted in FIGS. 1 and 2 is to initially place solid sheet material around the inner surface of the tank's cylinder-shaped body. Examples of such sheets include metal sheets and/or fiberglass/resin sheets. The metal sheet can be a thin gauge steel sheet, preferably with a diamond grid pattern on the surface which faces the wall of the tank 10. The fiberglass resin sheet shown in FIG. 1 preferably has a stucco appearance on the side facing the tank. Surface protrusions 20 extend in a random fashion from wall sections 16. It is preferred that the solid sheet material has an irregular surface on at least one side to ensure a seal is not formed by its contact with the tank walls. The fibrous reinforced resinous overlay 18 is next applied over the edges of the wall sections.

The resultant storage tank system of the invention represents an improved version of fibrous reinforced resinous tanks presently sold and used. Addition of the wall sections substantially strengthens the walls of the storage tank, thereby reducing the chance of tank collapse due to external weight forces. Attachment of the wall sections between rib recess strengthens that part of the tank most likely to suffer damage. Additionally, areas under the wall sections provide separate annular containment areas for receiving stored liquid which may leak through the inner walls or ground liquid which may seep through the storage tank walls.

A sufficient number of openings are either formed or added to storage tank 10. The openings are to accommodate various access lines to the interior of the tank. For instance, a fill pipe, dispensing line and vent pipe can enter the storage tank at various points in the tank's surface. The access lines can as well enter through cover 15 of manway 14 as evident in FIG. 1.

Figure 3:
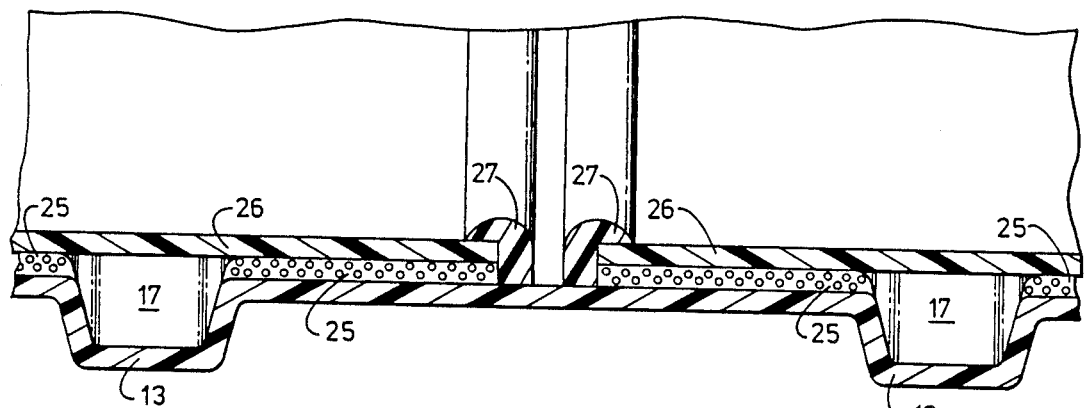
FIG. 3 is a side view in section showing a wall area of a storage tank system of this invention with the addition of separating material.

In a preferred embodiment of the invention, a separating material having an at least partially impervious outer planar surface is applied in spaced sections to the surface area on the tank's inner surface, including the inner surface of the outer end caps. The purpose of the separating material is to ensure that the subsequently applied fibrous reinforcing material and resinous material which form the wall sections will not seal to the interior wall of storage tank 10. FIG. 3 illustrates this aspect of the invention.

Separating materials include solid polymeric films, corrugated sheets, irregular surfaced sheets, and foraminous or porous materials which are sealed on at least one side. Many pliable or semi-rigid materials are usable. Examples of such material are polyethylene, jute, polyurethane foam, polyester foam, polyether foam, fiberglass matting, cotton matting, nylon matting, corrugated cardboard, steel sheets with an irregular surface, fiberglass resinous sheets with an irregular surface, and asbestos which range from about 0.01 inches to almost 1.0 inch in thickness. A heat seal or sealing material, e.g. a polymeric coating, or a impervious wrapping such as polyethylene sheeting is used on one surface of any foraminous materials when needed to prevent substantial saturation with subsequently applied resinous material.

The minimum thickness of the separating material must be sufficient to prevent the subsequently applied wall section from adhering to the storage tank. In FIG. 3, separating material 25 is an open cell foam. Subsequent placement of wall sections 26, use of overlays 27, and attachments of inner end caps as described with reference to FIGS. 1-2 is next done.

Figure 4:
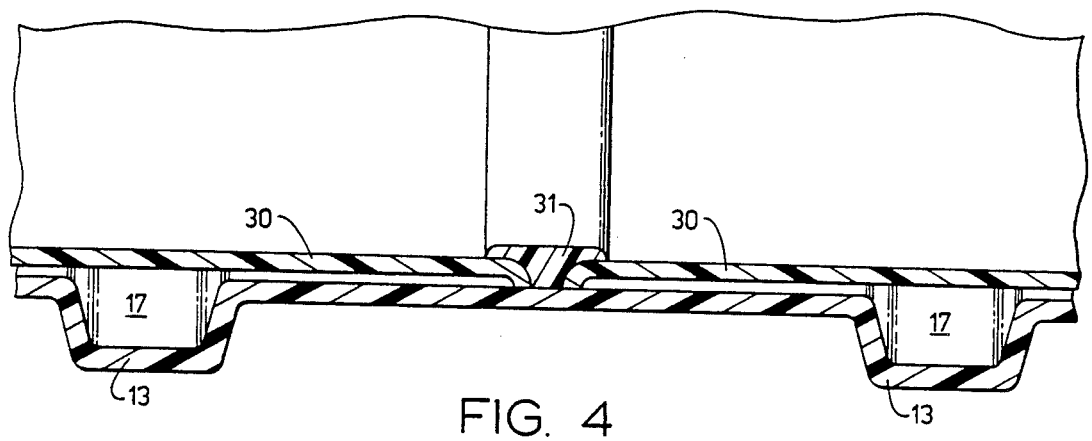
FIG. 4 is a side view in section showing a wall area in detail of another storage tank system of this invention.

With further reference to FIG. 4 there is shown a storage tank 10 of the type described in FIG. 1 wherein the interior wall spaces between the added wall sections 30 are covered with an overlay. Thus, the storage tank has a resinous overlay 31 applied so as to extend from one wall section edge to an adjacent wall section edge. In effect the wall sections 30, inner end caps and overlays 31 form a continuous surface which serves as the primary containment wall for stored liquid. The storage tank system of this aspect of the invention has all the advantages of the system described with references to FIGS. 1 and 2 plus the added feature of primary and secondary containment capability.

While not shown, the rib recesses can be filled or covered over to present a smooth interior surface prior to formation of the wall sections. This feature does not materially enhance the storage tank system, though does provide some added measure of strengthening.

While the invention has been described with respect to preferred embodiments, it is understood that various modifications may be made without departing from the spirit of the subject invention as defined by the appended claims. All obvious variations are within the scope of the claims.

What is claimed is:

1. A ribbed storage tank system comprising a fibrous reinforced resinous storage tank having a cylindrical-shaped main body and a set of substantially uniformly spaced integral ribs extending circumferentially around the main body such that the exterior of the tank has the ribs protruding therefrom and the interior of the tank is generally contoured with rib recesses which represent the insides of the ribs, further wherein a series of wall sections are spaced laterally and circumferentially around the interior of the tank's cylindrical-shaped main body so as to extend across the rib recesses to cover each recess, each of said wall sections attached at its edges to the interior of the tank's main body and a midportion of the wall section remains at least partially separated from the interior and the rib recess of the tank's main body.

2. The ribbed storage tank system of claim 1 further comprising a separating material placed between each said wall section and the interior of the cylindrical-shaped main body of the tank to provide a means whereby a substantial portion of each of the wall sections remains structurally independent of the interior of the cylindrical-shaped main body.

3. The ribbed storage tank system of claim 1 wherein the wall sections are formed at a distance less than about one inch in height from the interior of the tank's cylindrical-shaped main body.

4. The ribbed storage tank system of claim 3 wherein the wall sections are formed at a distance of from about 1/64 inch to about ¼ inch in height from the interior of the tank's cylindrical-shaped main body.

5. The ribbed storage tank system of claim 4 wherein each wall section is from about eight inches to about sixty inches in width.

6. The ribbed storage tank system of claim 5 wherein each wall section is from about twelve inches to about twenty inches in width.

7. The ribbed storage tank system of claim 1 wherein the wall sections are formed of a fibrous reinforced resinous material.

8. The ribbed storage tank system of claim 2 wherein the separating material is a foam, matting, net, screen or mesh.

* * * * *